Nov. 4, 1941.                C. A. ROBINSON                 2,261,288
                              NAILING MACHINE
                           Filed July 29, 1940          3 Sheets-Sheet 1
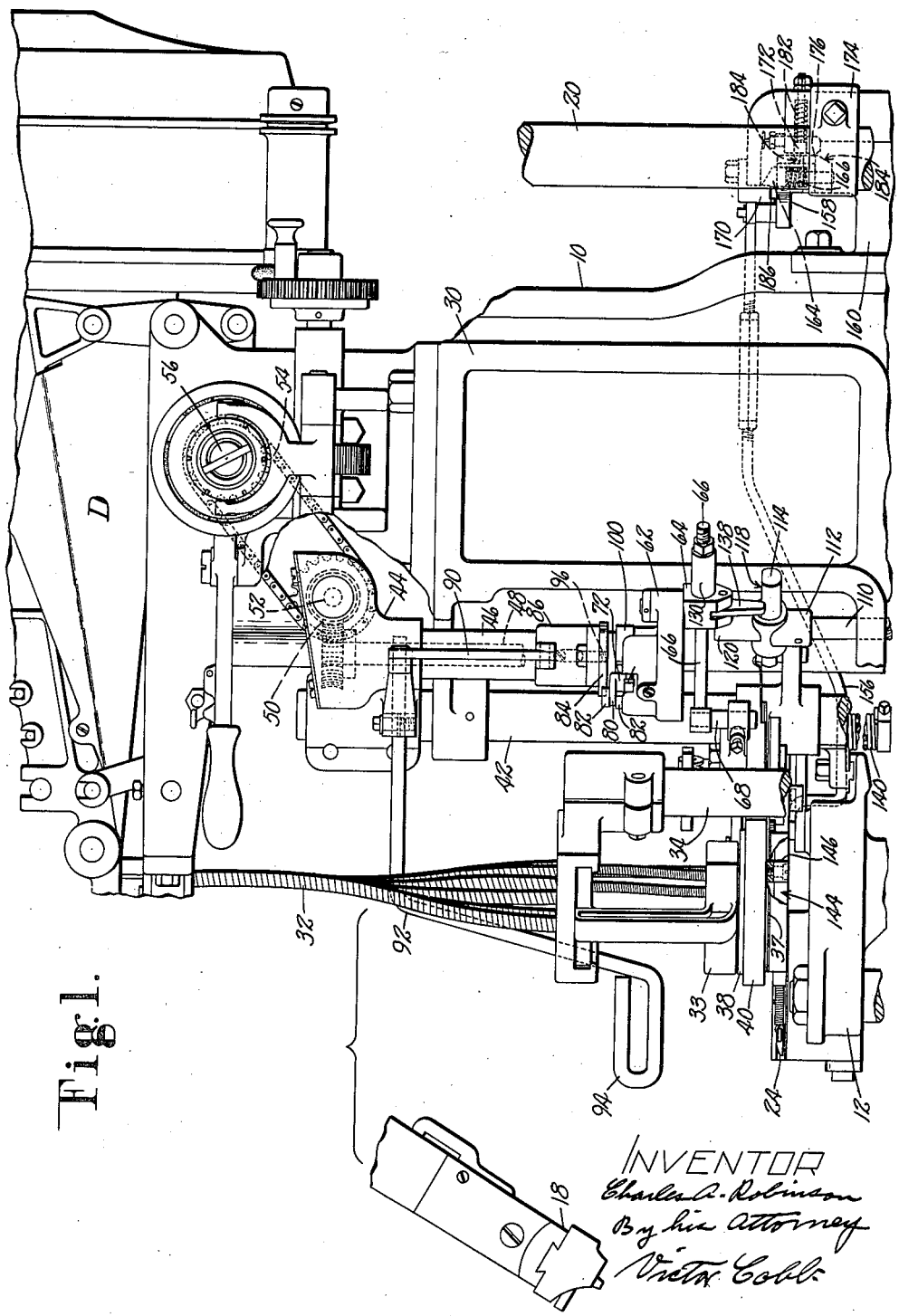

Nov. 4, 1941.                C. A. ROBINSON                2,261,288
                              NAILING MACHINE
                            Filed July 29, 1940        3 Sheets—Sheet 2

INVENTOR.
Charles A. Robinson
By his Attorney
Victor Colt.

Nov. 4, 1941.                C. A. ROBINSON                2,261,288
                             NAILING MACHINE
                           Filed July 29, 1940              3 Sheets-Sheet 3
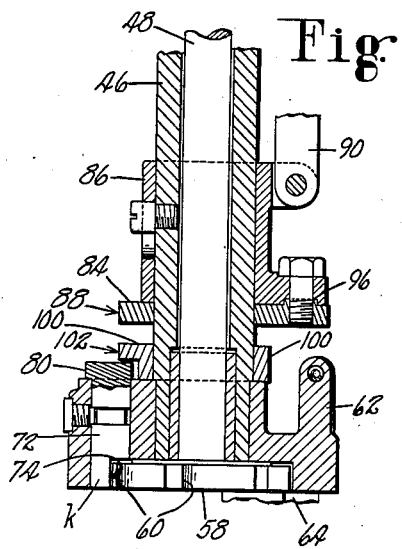
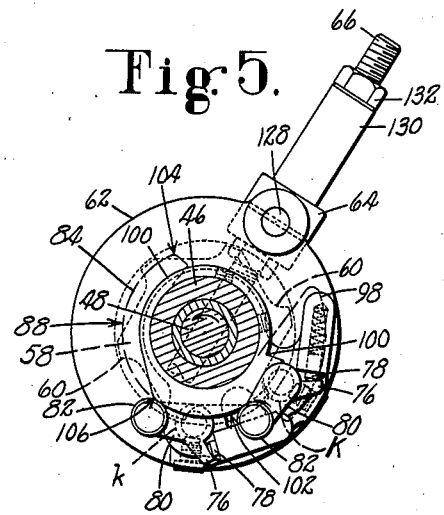
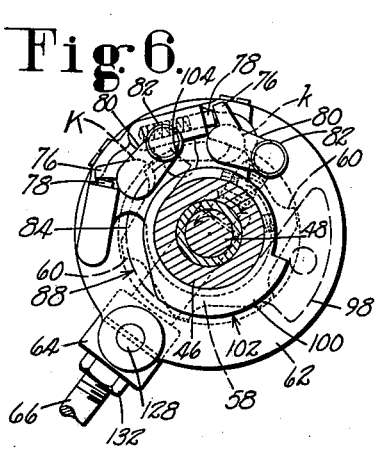
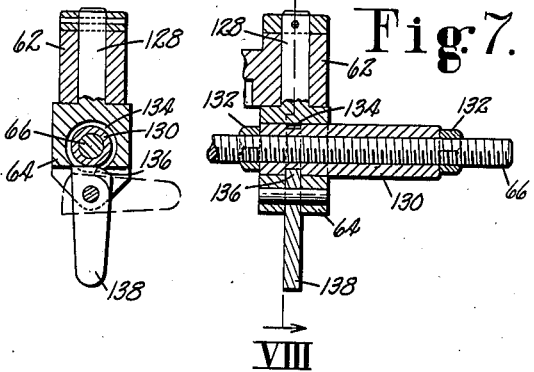
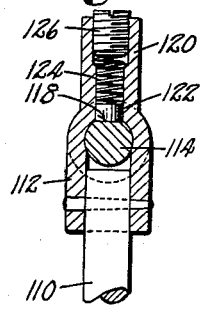
INVENTOR
Charles A. Robinson
By his Attorney
Victor Colby Patented Nov. 4, 1941

2,261,288

UNITED STATES PATENT OFFICE 2,261,288

NAILING MACHINE

Charles A. Robinson, Salem, Mass., assignor to United Shoe Machinery Corporation, Flemington, N. J., a corporation of New Jersey Application July 29, 1940, Serial No. 348,075

43 Claims. (Cl. 1—32)

My invention relates to machines for the insertion of nails or like fastenings to secure together work-portions, it being especially useful in connection with the attachment of heels to shoes.

An object of the invention is to deliver nails to the inserting mechanism of the machine, by power means which will effectively produce their transfer with a controllable dwell at the inserting mechanism, during which time complete delivery is assured. This object I achieve by combining with nail-inserting mechanism, as a die and cooperating nail-drivers, an oscillatory loader-arm or other nail-transferring member and a source of power, mechanism through which the transferring member may be actuated from the power means and which causes the dwell of the transferring member at the inserting mechanism. Disturbance of this period of dwell may be avoided by the application of a frictional load to the transferring member. The actuating mechanism preferably takes the form of a clutch having a driving member to which power is applied and a driven member joined to the transferring member, said clutch including two devices, which may consist of rotatable keys, one movable to connect the driving member and driven member and thereby initiate travel of the transferring member toward the inserting mechanism, and the second movable to connect the driving and driven members for the completion of the travel. Between the action of the two keys or connecting devices there may be an interval during which the travel of the transferring member will be arrested to give the desired dwell. The connecting devices may be movable upon the driven member of the clutch for engagement with teeth upon the driving member. In the present instance, the idle interval is obtained by causing the connecting movement of the second connecting member between the driving teeth, whereby its effective engagement is temporarily prevented. The first of the keys or devices, which initially holds the driven member disconnected, may be controlled in its connecting action by such a member as a cam movable by the operator, while the second connecting member is governed by another controlling member or cam. This first cam may be varied in position to alter the timing of the dwell of the transferring member at the inserting mechanism. Since it may be desired to move the transferring member independently of the driving means, for example to clear clogged nails, I provide in the connections between the power means and the transferring member means for the ready release of the latter. There is a link pivoted to the transferring member and a member driven by the power means, said member and link being capable of relative movement, and a latch is arranged to connect the member to the link.

Another object of the invention is to obtain a movement of the transferring member or loader-arm so close to the nailing die of the machine, that the entrance of nails into the receiving passages of the die is made certain. It has been customary to have the transferring member, in making its delivery of nails to the die, pass above a carrier or swing-plate by which heel-parts, as a base and a top-lift, are presented in separate holders for attachment. This so separates the transferring member from the openings into the die-passages, that the nails tend to engage the upper die-surface and do not with certainty enter said passages. This difficulty I overcome by causing the transferring member, in its nail-delivering movement, to so act upon the carrier as to remove both its heel-holder and its top-lift-holder from above the die. Thus, the transferring member may travel in close proximity to the upper surface of the die, as it moves the carrier before it. To permit this relation, the heel-holder is preferably upon the side of the carrier toward the transferring member, and there is means, as a spring, for returning the carrier, upon reverse travel of the transferring member, to bring the heel-holder into attaching position over the nailing die. In this position the carrier is temporarily retained, as by latching means, and there is means for releasing this retaining means, so the top-lift-holder may be brought into attaching position. This release may be effected by means movable by mechanism which presses the work against the nailing die. Thus, two latches are provided, one which may retain the swing-plate or carrier in heel-presenting relation against the force of the spring which returns it, and a second latch for the first, which second latch frees the carrier for movement by the spring into top-lift-presenting relation during movement of the work-pressing mechanism. The shock which the carrier tends to produce when returned by its spring is effectively reduced by a cushioning device, connected to a member fixed relatively to the die, as the cross-head by which it is carried, and to a lever fulcrumed upon the fixed member, which lever is engaged by the carrier in its return-movement. This cushioning device is herein illustrated as a dash-pot, the cylinder and piston of which are joined to the crosshead and to an arm of the lever, another arm of which lever is engaged by the carrier in its return. By choosing a proper ratio between the lever-arms, the damping resistance to movement of the carrier may be greatly increased.

In the accompanying drawings,

Fig. 1 shows in broken side elevation a particular embodiment of the present invention applied to a heel-attaching machine;

Figure 3:
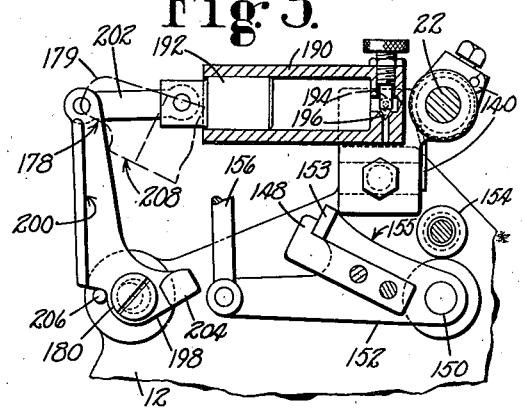
Figure 2:
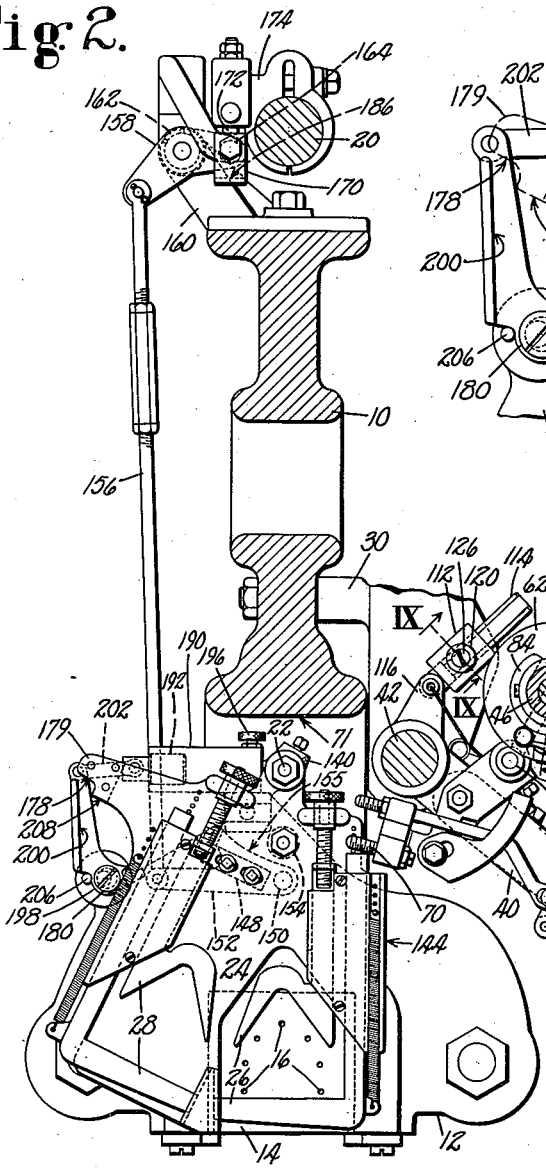
Fig. 2 is an irregular horizontal section taken somewhat above the nailing die of the heeler.

Fig. 3, a detail view in broken top plan of the controlling elements for the swing-plate which are mounted upon the crosshead of the heeler, some of the elements upon the swing-plate itself being included;

Fig. 4, an enlarged vertical sectional detail on line IV—IV of Fig. 2;

Fig. 5, a horizontal sectional detail taken just above the clutch mechanism, with the elements in their normal relation;

Fig. 6, a like view showing the elements as positioned at the beginning of the period of dwell;

Fig. 7, a longitudinal sectional detail through the releasing means included in the actuating connections for the loader-arm;

Fig. 8, a transverse section on the line VIII—VIII of Fig. 7; and

Fig. 9, a sectional detail of the friction device for the loader-arm taken on the line IX—IX of Fig. 2.

At 10 appears a portion of the frame-column of such a heel-attaching machine as that made the subject of Letters Patent of the United States No. 1,157,688, Glidden, October 26, 1915. Upon this is movable a crosshead 12 carrying a die-block 14 in which are passages 16 for heel-attaching nails, and from which said nails are inserted by the customary drivers. A shoe-supporting jack 18 is pivoted upon an unillustrated top-lever, which jack, by a reciprocatory back-rod 20, is lowered to press the work against the die-block, or raised so it can be swung out to the position illustrated in Fig. 1 of the drawings for the application and removal of a shoe. At 22 is pivoted for horizontal oscillation upon the crosshead a swing-plate 24, serving as a carrier for a heel-base applied to a holder 26 at one side of the plate and a top-lift applied to an adjacent holder 28. While the swing-plate and its holders generally may be conventional, it has a novel arrangement for successively presenting the heel and top-lift above the die-block 14 for attachment to a shoe upon the jack 18. This will later be described in detail. Nails are supplied from a distributor D, which may be that of Letters Patent of the United States No. 1,005,303, Pope, October 10, 1911, mounted upon a bracket 30 secured to the frame-column 10. The nails pass in successive loads through tubes 32 to a foot-plate 33 mounted upon a vertical rod 34 rising from a supporting arm 35 (Fig. 2). Below the foot-plate the nails are received and temporarily retained by gate mechanism 37 in passages 36 in a loader-block 38, these passages being arranged in the same nailing design as the die-passages 16. The loader-block is carried by an oscillatory arm 40 pivoted about a vertical rod 42 fixed in the bracket 30 and to which the arm 35 is clamped. The loader-arm 40 is swung from the nail-receiving position of the loader-block beneath the foot-plate, as determined by contact with the rod 34 and as appears in Fig. 2, over the die 14 to effect the transfer of the load of nails by clutch-controlled power mechanism, which will now be described.

Secured to the upper extremity of the rod 42 is a housing 44, having depending from it a sleeve 46. Journaled within the housing and sleeve is a vertical shaft 48, constantly rotated during the operation of the apparatus through spiral gearing 50, a horizontal shaft 52 journaled in the housing, and sprocket-gearing 54 from the main shaft 56 of the distributor D. Fixed upon the lower end of the shaft 48 below the sleeve 46 is a driving disk 58 of the clutch mechanism (Fig. 4), this having peripheral teeth 60, shown in Figs. 5 and 6 as six in number. Surrounding the driving disk and free to turn upon a raised portion of its upper face is a casing 62. This casing furnishes the driven member of the clutch, and depending from one side of its lower portion is a connecting member 64 joined by a rod 66 to a pin 68 fast upon the loader-arm 40. When the driving disk 58 is coupled to the casing 62, the member 64, serving as a crank-pin and turning through 360°, oscillates the loader-arm to carry its die-block 38 from its nail-receiving position beneath the foot-plate 33 to its delivering position over the die-block 14 and back to its initial position. The registration of the loader-block-passages 36 with the die-block-passages 16 may be determined by contact of a stop-screw 70 upon the loader-arm with a surface 71 upon the frame-column (Fig. 2).

To couple the clutch members 58 and 62 for the actuation of the loader-block, they are provided with a plurality of keys or connecting devices, shown as two in number and designated, respectively, as K and k. With six teeth 60 upon the driving disk, these keys will be separated from one another by somewhat more than 60°. Each key consists of a cylindrical spindle 72 (Fig. 4), mounted in the casing 62 for rotation about a vertical axis and having at its lower extremity an engaging portion formed by cutting away one side of the spindle to give a flat surface 74. This portion lies in close proximity to the periphery of the driving disk 58. With the surface 74 substantially tangent to said periphery, the key is out of engagement with the disk-teeth, and the clutch-casing remains at rest. But when the key is turned about its axis, one of the teeth engages a corner formed by the cylindrical and flat key-surfaces, and the casing will be rotated.

Each key has at its upper end above the casing a short projection 76 engaged by a spring-pressed plunger 78, the effect of which is to urge the key into its active or driving relation. To turn the keys to their inactive positions, there is a normally stationary cam associated with each and arranged for contact with an arm 80, upon the upper face of the end of which is a rotatable roll 82.

The roll of the key K travels in the horizontal plane of a cam 84, shown in Figs. 5 and 6 in dash lines. This cam is secured at the bottom of a collar 86 (Fig. 4), guided for limited vertical movement upon the lower extremity of the sleeve 46. It normally occupies its lowest position in which an extended surface 88 receives contact of the roll in its travel to rotate the key against the force of its plunger 78 and release the casing 62 from driving engagement. To the collar 86 a link 90 is pivoted, the upper extremity of which is joined to a hand-lever 92 fulcrumed upon the housing 44 and extending outwardly and downwardly to a point just above the crosshead 12, where it has a portion 94 for actuation by the operator. The cam is preferably attached to the collar 86 by a slot-and-screw connection 96, which permits its adjustment circumferentially of the casing, so the timing of its control may be varied. It has a transverse enlargement 98 into which the screw of the connection 96 is threaded, and which, upon release of the lever 92 by the operator, rests upon the top of the key K, so the clutch is temporarily held in engagement. Below the cam 84 a cam 100 is secured about the bottom of the sleeve 46. This cam appears in full lines in Figs. 5 and 6 and has an edge-surface 102 with which the roll 82 of the key k contacts to release the casing 62 from the driving disk 58.

Figs. 2 and 5 of the drawings show the elements of the clutch mechanism in their normal relation. At this time, the cam 84 is lowered and the roll of the key K rests against the surface 88. The roll 82 of the key k contacts with the surface 102 of the cam 100. Both keys are out of driving engagement with the teeth 60 of the disk 58, and the casing 62 is stationary. The loader-block 38 is beneath the foot-plate 33, and its passages 36 contain a load of nails. The connecting member 64 and the rod 66 are vertically alined or upon a dead-center, giving the relation in which the loader-arm is least liable to be displaced. When the operator desires to deliver the load of nails to the die-block 14, he shifts the lever 92 to lift the cam 84. As previously indicated, this permits the key K to engage a tooth of the disk 58, so the casing 62 is rotated, and, through the connecting elements 64 and 66, the loader-arm 40 begins its nail-transferring movement. During a portion of the rotation of the casing, the cam 84 is held up upon the key K, but is soon released to later become effective. When the connecting member 64 has turned through substantially 180° and is again upon the stable dead-center, the roll 82 of the key K has reached at 104 the beginning of the cam-surface 88, as appears in Fig. 6. This rotates the key to free the casing from the driving disk; the loader-arm stops with the loader-block-passages 36 in registration with the die-block-passages 16; and the nails are freed by the gate device 37 to fall into the die-block. The roll of the key k has been released into disk-engaging relation by the cam-surface 102, but it will be seen that its lower disk-engaging portion is between the driving surfaces of two of the teeth 60. Consequently, there is a period during which the loader-block is held stationary above the die-block, giving ample time for the nails to fall into the passages 16. After a time, depending upon the number of teeth 60 and the corresponding space between the keys K, k, a tooth reaches the key k to again connect the casing to the disk, so through the remaining 180° of revolution of the connecting member 64 the loader-block is returned to its normal position beneath the foot-plate. The disengaged relation of the key K has been held by the cam-surface 88, and the beginning of the cam-surface 102 at 106 is now reached by the roll of the key k. This fully disengages the clutch-casing from the driving disk, so the loader-block again stops in its position beneath the foot-plate ready for the succeeding nail-delivery. To obtain the correct timing of the initiation of the period of dwell of the loader-block over the die-block, the cam 84 may be adjusted through its slot-and-screw connection 96 to alter the key-disengaging location of the cam-point 104.

To prevent play of the actuating connections of the loader-arm and steady the arm and said connections during oscillation, I have shown them as under the influence of a friction device. As more fully disclosed in Letters Patent of the United States No. 2,175,227, Stannick, October 10, 1939, the heeler of the previously mentioned Glidden patent has associated with the loader-arm and treadle mechanism a safety mechanism, which guards against depression of the treadle while the loader-block is above the die-block. This safety mechanism includes a vertical rod 110 (Figs. 1 and 9) carrying a head 112, through an opening in which is arranged to slide a link 114 pivoted to an arm 116 (Fig. 1) turning with the loader-arm. With the head and link I associate the friction device. The upper side of the link is flattened at 118, and in an upward extension 120 of the head a friction plug 122 is movable, it being urged against the link by an expansion-spring 124 backed by a screw 126. This applies to the loader-arm a slight frictional load, which tends to hold it in whatever position it may assume. Consequently, shocks produced by the abrupt contact of elements in the loader or connected mechanisms will not disturb the relation of the clutch-casing 62, with its connecting keys, to the teeth of the driving disk 58, and thus the period of dwell of the loader-block. By adjusting the position of the screw 26, the frictional effect may be varied to obtain the best result.

In the operation of the loading mechanism accidents may occur, such as the clogging of nails in the extreme positions, which renders it desirable to be able to shift the loader-arm manually without affecting the power actuating mechanism. Referring to Figs. 7 and 8 of the drawings, the connecting member 64 is pivotally joined to the clutch-casing 62 by an upward projection 128. The connecting rod 66 for the loader-arm passes through a bushing 130, which is held in place by contact with its opposite ends of nuts 132, 132, threaded upon the rod. In the bushing is a circumferential groove 134, and into this may enter a latch 136 pivoted at the bottom of the connecting member. This latch is held by the weight of the tail 138 normally in the groove to couple the member, bushing and rod to move together. When the operator wishes to free the loader-arm from the actuating mechanism, he has only to swing the latch-tail upwardly, removing the latch from the groove. Now the loader-arm, with its connecting rod, may be moved as desired, while the clutch-casing remains at rest.

Turning to the heel- and top-lift-carrying swing-plate 24, I so arranged the heel-holder 26 and the top-lift-holder 28 that the former is at the side toward the loader-arm 40. Into both its heel- and top-lift-presenting positions over the die-block 14, the swing-plate is urged by a torsion-spring 140 associated with its pivotal mounting 22. In the first of these positions, it is temporarily held, as will hereinafter appear. Extending along the right-hand edge of the swing-plate is a vertical wall 144, and, as the loader-arm 40 advances to make its delivery of nails to the die-block, a roll 146, rotatable upon its underside, engages the wall and, as it travels over said wall, shifts the swing-plate before it. Therefore, before the loader-block reaches its nail-delivering position the swing-plate is entirely removed from above the die-block; the lower face of the loader-block, with its gate 37, may move as close to the upper face of the die-block as is desirable; and the direct descent of the nails into the passages 16 is assured. When the loader-arm returns to its nail-receiving position beneath the foot-plate 33, the heel-holder 26, carried back by its spring 140, must stop in heel-presenting position, as appears in Fig. 2. Upon the under face of the swing-plate is secured a contact member 148 (Fig. 3). Fulcrumed at 150 upon the crosshead 12 beneath the swing-plate is a bell-crank-lever 152, furnishing a latch, one arm of which has an upward projection at 153 arranged to engage and retain the contact member 148 and therefore hold the swing-plate against the force of the spring 140. The projection 153 normally lies clear of the path of the contact member 148, but, as the swing-plate is forced from the die-block by the loader-arm, a roll 154 upon the underside of said swing-plate engages a curved edge-surface 155 of the lever 152. After the contact member has passed the latching projection, the roll riding over the surface 155 brings said projection into position to receive contact of the member 148 upon its return movement. A second arm of the lever is joined by a rod 156 to a bell-crank-lever 158, fulcrumed upon a bracket 160 projecting from the rear of the frame-column 10. A torsion-spring 162, associated with the fulcrum of the lever 158, exerts its force to urge the rod 156 rearwardly and swing the lever 152 in a clockwise direction (Fig. 3) to carry its projection 153 out of the path of the contact member 148 for the retraction of the swing-plate by the spring 140. To temporarily hold the projection 153 in its plate-latching position, the lever 158 carries, upon an arm opposite that connected by the rod 156 and offset downwardly therefrom (Fig. 1), a second latch 164. This second latch is urged upwardly by an expansion spring 166 for retention by the body-portion of a stop 170 depending from the bracket 160. This so holds the lever 158 and the rod 156 that the latch-projection 153 is maintained in the path of the contact member 148. Upon reverse travel of the loader-arm, this will retain the swing-plate with its holder 26 in heel-presenting relation about the die-block during the driving of the attaching nails from the passages 16.

In preparation for this nail-driving, the back-rod 20 is lifted to lower the jack 18 and press the supported shoe upon the heel-base in the holder 26. The attachment having been accomplished, the back-rod is lowered to lift the jack, so the holder 28 of the swing-plate may assume its top-lift-presenting relation. The upward travel of the back-rod is without effect upon the latching mechanism, but, upon the downward movement, a releasing member 172 arranged to slide horizontally in a bracket 174 clamped to the back-rod, strikes an arm 176 projecting horizontally from the bottom of the second latch 164. This depresses the latch below body-portion of the stop 170, whereupon the spring 162 acts to turn the lever 158 clockwise, and, through the rod 156, imparts a like movement to the lever 152. This removes the latching projection 153 from behind the contact member 148, and the spring 140 operates the swing-plate to carry the top-lift-holder 28 above the die-block. Its travel in this direction may be stopped adjustably by contact of a surface 178 (Fig. 3) upon a projection 179 from the rear of the swing-plate with an eccentric 180, which may be clamped upon the crosshead 12 in different angular positions about its axis. The idle upward movement of the releasing member 172 may be provided for by making it yieldable against a spring 182 and forming upon the upper side of its contact-end and upon the underside of the latch-arm 178 complementally inclined surfaces 184, 184, which act to cam out the releasing member as the back-rod rises. To limit the extent of movement of the secondary latch-lever by the spring 162, and, therefore, the swing-plate-releasing movement of the primary latch-lever 152 in their clockwise action, the stop 170 may have at its forward side a projection 186 lying below the body-portion of the stop by which the latch 164 is first retained. When the releasing member 172 depresses the latch below this body-portion and the spring 162 acts, said latch is carried against the projection and the swing-plate-releasing oscillation of the lever 152 correctly arrested.

To prevent too violent contact of the swing-plate 24 with the stop 180 which limits its movement, and consequent reverse displacement, a cushioning device is employed. Upon the crosshead 12 a horizontal cylinder 190 is mounted, in which a piston 192 is movable. Free inward travel of the piston through the cylinder is permitted by a check-valve 194, and resistance to opposite movement may be controlled by a leakage-valve 196. Upon the crosshead about the axis of the eccentric-stop 180, a bell-crank-lever 198 is fulcrumed. To a long rearwardly extending arm of the lever, provided with a vertical wall 200, the piston 192 is connected by a rod 202. A second shorter arm of the lever has an upward projection 204. As the swing-plate is turned idly away from the die-block 14 under the influence of the loader-arm 40 in making its nail-delivery, the end of the swing-plate-projection 179 contacts with the wall 200, and, as it passes along said wall, swings the lever anti-clockwise (Fig. 3). A stop-pin 206 rising from the crosshead prevents overthrow of the lever in this direction. The piston 192 is thus drawn out idly through the cylinder 190. Upon release of the swing-plate by the latch-lever 152 for movement to its top-lift-presenting position under the influence of the spring 140, a surface 208 upon the projection 179 engages the lever-projection 204. This turns the lever clockwise, forcing in the piston through the cylinder and checking the progress of the swing-plate, which comes to rest in the correct position, without rebound, with the surface 178 against the eccentric stop 180. It will be observed that the length of the arm of the lever 198, connected to the piston of the dash-pot, is several times that of the arm which is struck by the projection from the swing-plate. The resistance offered by the dash-pot is, therefore, proportionately increased.

At the beginning of an operating cycle, the jack 18 is raised, as appears in Fig. 1 of the drawings; the top-lift-holder 28 of the swing-plate 24 is over the die-block 14; and the loader-block 38 is below the foot-plate 33 and contains a load of nails in the passages 36, these having been supplied from the distributor D. The clutch mechanism is as appears in Fig. 5. The operator actuates the lever 92, causing the key K in the clutch-casing 62 to be released by the cam 84 and to engage a tooth 60 of the constantly rotating driving disk 58. This acts upon the loader-arm 40 to carry the loader-block over the die-block and make its delivery of nails to the passages 16. At this time, the point 104 of the cam 84 turns the key k out of contact with the tooth of the disk 58 which has been driving it. The key k of the clutch has been freed by the cam 100, but is between the key-engaging surfaces of the teeth of the disk, so the loader-block dwells for a time over the die-block to make certain the entrance of the nails into its passages. When the succeeding tooth reaches the key k, it engages said key to complete the rotation of the casing and return the loader-block beneath the foot-plate, the cams 84 and 100 rotating both keys to release the clutch-casing. With the spacing of the teeth 60 herein described, the dwell of the loader-block may be varied between substantially 60° of rotation of the driving disk and zero by increasing the separation between the keys K and k. For a longer dwell, the number of teeth may be reduced, with a corresponding spacing of the keys. When the loader-arm advanced over the die-block, it entirely displaced the swing-plate, so there was nothing to interfere with the close approach of the lower surface of the loader-block to the upper surface of the die-block, and the direct descent of nails from the passages in the former into those of the latter. Upon reverse movement of the loader-arm, the swing-plate is retracted by its spring 140 and retained in heel-presenting relation by the latch-lever 152, which is itself latched by the second latch-lever 158. The operator applies a heel and a top-lift to the holders 26 and 28, respectively; places a shoe upon the jack 18; swings said jack down over the die-block; and treadles the machine. Through the back-rod 20 pressure is applied to clamp the heel-seat of the jacked shoe upon the heel-base in the holder 26, and the drivers of the machine rise through the passages 16 to insert the base-attaching nails with their heads left projecting from the base-surface. When the back-rod descends to elevate the jack for the movement of the swing-plate to top-lift-presenting position, its releasing member 172 trips the latch-lever 158, allowing its tensioned spring 162 to withdraw the latch-lever 152 from the swing-plate. This permits the spring 140 to shift the top-lift-holder 28 into position above the die-block, as determined by the eccentric stop 130. The dash-pot device 190, 192, with the arm-ratio of its connecting lever 198 magnifying the cushioning effect, brings the swing-plate to rest without rebound. A second treadling of the machine by the operator results in the spanking of the top-lift upon the nails projecting from the heel-base; the jack 18 rises; and it may be swung out by the operator to remove the work. The operating cycle of the machine is thus completed.

Having described my invention, what I claim as new and desire to secure by Letters Patent of the United States is:

1. In a nailing machine, nail-inserting mechanism, a nail-transferring member delivering to the inserting mechanism, power means, and mechanism through which the transferring member may be actuated from the power means, the actuating mechanism including a driving member, a driven member and means for first connecting the driven member to and then disconnecting it from the driving member and thereby producing a dwell of the transferring member at the inserting mechanism.

2. In a nailing machine, nail-inserting mechanism, a nail-transferring member delivering to the inserting mechanism, power means, and mechanism through which the transferring member may be connected to or disconnected from the power means, said connecting mechanism including means for first joining the transferring member to the power means to carry said transferring member from a nail-receiving position to the inserting mechanism, then disconnecting the transferring member from the power means while said transferring member remains at rest at the inserting mechanism and finally connecting the transferring member to the power means for return to its nail-receiving position.

3. In a nailing machine, nail-inserting mechanism, a nail-transferring member delivering to the inserting mechanism, and a clutch provided with a driving member and a driven member joined to the transferring member, said clutch having a device movable to connect the driving member to the driven member and thereby initiate the travel of the transferring member toward the inserting mechanism and a device movable to connect the driving and driven members for the completion of the travel of the transferring member.

4. In a nailing machine, nail-inserting mechanism, a nail-transferring member delivering to the inserting mechanism, a clutch provided with a driving member and a driven member joined to the transferring member, said clutch having a device movable to connect the driving member to the driven member and thereby initiate the travel of the transferring member toward the inserting mechanism and a device movable to connect the driving and driven members for the completion of the travel of the transferring member, and means arranged for actuation by the operator to control the movement of the first connecting device.

5. In a nailing machine, nail-inserting mechanism, a nail-transferring member delivering to the inserting mechanism, a clutch provided with a driving member and a driven member joined to the transferring member, said clutch having a device movable to connect the driving member to the driven member and thereby initiate the travel of the transferring member toward the inserting mechanism and a device movable to connect the driving and driven members for the completion of the travel of the transferring member, means arranged for actuation by the operator to control the movement of the first connecting device, and means for controlling the movement of the second connecting device.

6. In a nailing machine, nail-inserting mechanism, a nail-transferring member delivering to the inserting mechanism, a clutch provided with a driving member and a driven member joined to the transferring member, said clutch having a device movable to connect the driving member to the driven member and thereby initiate the travel of the transferring member toward the inserting mechanism and a device movable to connect the driving and driven members for the completion of the travel of the transferring member, means arranged for actuation by the operator to control the movement of the first connecting device, means for controlling the movement of the second connecting device, and means arranged to vary the position of the first mentioned means to alter the time of its control.

7. In a nailing machine, nail-inserting mechanism, a nail-transferring member delivering to the inserting mechanism, and a clutch provided with a driving member and a driven member joined to the transferring member, said clutch having a device movable to connect the driving member to the driven member and thereby initiate the travel of the transferring member toward the inserting mechanism and a device movable to connect the driving and driven members for the completion of the travel of the transferring member, there being an interval between the connecting movement of the two devices during which the travel of the transferring member may be arrested.

8. In a nailing machine, nail-inserting mechanism, a nail-transferring member delivering to the inserting mechanism, a clutch provided with a driving member and a driven member joined to the transferring member, said clutch having a device movable to connect the driving member to the driven member and thereby initiate the travel of the transferring member toward the inserting mechanism and a device movable to connect the driving and driven members for the completion of the travel of the transferring member, there being an interval between the connecting movement of the two devices during which the travel of the transferring member may be arrested, and means arranged to vary the timing of the interval.

9. In a nailing machine, a nailing die, a loader-arm provided with passages for receiving nails and delivering them to the die, and a clutch having a toothed driving member and a driven member joined to the loader-arm, a key rotatable upon the driven member for engagement with a tooth of the driving member to carry the loader-arm toward the die and a second key rotatable upon the driven member for engagement with a tooth of the driving member to reverse the movement of the loader-arm.

10. In a nailing machine, a nailing die, a loader-arm provided with passages for receiving nails and delivering them to the die, and a clutch having a toothed driving member and a driven member joined to the loader-arm, a key rotatable upon the driven member for engagement with a tooth of the driving member to carry the loader-arm toward the die and a second key rotatable upon the driven member for engagement with a tooth of the driving member to reverse the movement of the loader-arm, the rotation of said second key to engaging position occurring between teeth, whereby driving engagement is temporarily prevented.

11. In a nailing machine, a nailing die, a loader-arm provided with passages for receiving nails and delivering them to the die, a clutch having a toothed driving member and a driven member joined to the loader-arm, a key rotatable upon the driven member for engagement with a tooth of the driving member to carry the loader-arm toward the die and a second key rotatable upon the driven member for engagement with a tooth of the driving member to reverse the movement of the loader-arm, and a cam acting upon each key to control its engagement with the teeth of the driving member.

12. In a nailing machine, a nailing die, a loader-arm provided with passages for receiving nails and delivering them to the die, a clutch having a toothed driving member and a driven member joined to the loader-arm, a key rotatable upon the driven member for engagement with a tooth of the driving member to carry the loader-arm toward the die and a second key rotatable upon the driven member for engagement with a tooth of the driving member to reverse the movement of the loader-arm, and a cam acting upon each key to control its engagement with the teeth of the driving member, the cam of the first-mentioned key being arranged for movement by the operator to release said key for its engagement.

13. In a nailing machine, a nailing die, a loader-arm provided with passages for receiving nails and delivering them to the die, a clutch having a toothed driving member and a driven member joined to the loader-arm, a key rotatable upon the driven member for engagement with a tooth of the driving member to carry the loader-arm toward the die and a second key rotatable upon the driven member for engagement with a tooth of the driving member to reverse the movement of the loader-arm, and a cam acting upon each key to control its engagement with the teeth of the driving member, the cam of the second key acting to release said key between teeth of the driving member whereby its effective engagement is delayed.

14. In a nailing machine, a nailing die, a loader-arm provided with passages for receiving nails and delivering them to the die, a toothed driving member, a rotatable casing surrounding the driving member, a link joining the casing to the loader-arm, a spindle movable upon the casing and provided with a key-portion for engagement with a tooth of the driving member to move the loader-arm relatively to the die, an arm upon said spindle, and a cam contacting with the arm to control the engagement of the key-portion.

15. In a nailing machine, a nailing die, a loader-arm provided with passages for receiving nails and delivering them to the die, a toothed driving member, a rotatable casing surrounding the driving member, a link joining the casing to the loader-arm, a spindle movable upon the casing and provided with a key-portion for engagement with a tooth of the driving member to carry the loader-arm over the die, an arm upon said spindle, a cam contacting with the arm to control the engagement of the key-portion, and a lever movable by the operator to remove the cam from the path of the arm.

16. In a nailing machine, a nailing die, a loader-arm provided with passages for receiving nails and delivering them to the die, a toothed driving member, a rotatable casing surrounding the driving member, a link joining the casing to the loader-arm, a spindle movable upon the casing and provided with a key-portion for engagement with the teeth of the driving member to carry the loader-arm over the die, an arm upon said spindle, a cam contacting with the arm to control the engagement of the key-portion, a second spindle rotatable upon the casing and having a key-portion for engagement with the teeth of the driving member to reverse the movement of the loader-arm, an arm upon said second spindle, and a cam contacting with the last-mentioned arm to control the engagement of its key-portion with the driving member.

17. In a nailing machine, nail-inserting mechanism, a nail-transferring member delivering to the inserting mechanism, power means, mechanism through which the transferring member may be connected to or disconnected from the power means, said connecting mechanism including means for producing a dwell of the transferring member at the inserting mechanism, and means for applying a frictional load to the transferring member to prevent disturbance of the period of dwell.

18. In a nailing machine, a nailing die, a loader-arm provided with passages for receiving nails and delivering them to the die, a friction device acting to resist movement of the loader-arm to steady it in such movement, and a clutch having a toothed driving member and a driven member joined to the loader-arm, a key rotatable upon the driven member for engagement with a tooth of the driving member to carry the loader-arm toward the die and a second key rotatable upon the driven member for engagement with a tooth of the driving member to reverse the movement of the loader-arm.

19. In a nailing machine, a nailing die, a loader-arm provided with passages for receiving nails and delivering them to the die, a friction device acting to resist movement of the loader-arm to steady it in such movement, means arranged to vary the friction applied by the device, and a clutch having a toothed driving member and a driven member joined to the loader-arm, a key rotatable upon the driven member for engagement with a tooth of the driving member to carry the loader-arm toward the die and a second key rotatable upon the driven member for engagement with a tooth of the driving member to reverse the movement of the loader-arm.

20. In a nailing machine, nail-inserting mechanism, a nail-transferring member delivering to the inserting mechanism, power means through which the transferring member is moved between nail-receiving and nail-delivering positions, a link pivoted to the transferring member, a member connected to the power means, said member and link being capable of relative movement, and a latch arranged to connect the member to the link.

21. In a nailing machine, nail-inserting mechanism, a nail-transferring member delivering to the inserting mechanism, power means through which the transferring member is moved between nail-receiving and nail-delivering positions, a link pivoted to the transferring member and provided with a depression, a member connected to the power means, said member and link being capable of relative movement, and a latch pivoted upon the member and movable into and out of the depression.

22. In a nailing machine, nail-inserting mechanism, a nail-transferring member delivering to the inserting mechanism, power means through which the transferring member is moved between nail-receiving and nail-delivering positions, a link pivoted to the transferring member, a member movable along the link and having a projection engaging the power means, and means for releasably latching the member and link together.

23. In a nailing machine, nail-inserting mechanism, a nail-transferring member delivering to the inserting mechanism, power means through which the transferring member is moved between nail-receiving and nail-delivering positions, a link pivoted to the transferring member and about which is an annular groove, a member movable along the link and having a projection engaging the power means, and a latch pivoted upon the member to enter the groove or to be withdrawn therefrom.

24. A clutch comprising a driving member, a driven member, two keys movable upon a driven member, means for operating one of the keys to connect the members and thereafter to disconnect them to initiate a period of dwell, and means for operating the other key to reconnect the members to terminate the period of dwell and finally to disconnect them.

25. In a heel-attaching machine, a nailing die provided with nail-receiving passages, a carrier having a heel-holder and a top-lift-holder mounted to move above the die, and a transferring member movable to deliver nails to the die-passages and acting upon the carrier to remove both the heel- and top-lift-holders from above the nail-receiving passages of the die.

26. In a heel-attaching machine, a nailing die provided with nail-receiving passages, a carrier having a heel-holder and a top-lift-holder mounted to move above the die, a transferring member movable to deliver nails to the die-passages and acting upon the carrier to remove both the heel- and top-lift-holders from above the nail-receiving passages of the die, and means for returning the carrier to bring both holders into attaching position.

27. In a heel-attaching machine, a nailing die provided with nail-receiving passages, a carrier having a heel-holder and a top-lift-holder mounted to move above the die, a transferring member movable to deliver nails to the die-passages and acting upon the carrier to remove both the heel- and top-lift-holders from above the nail-receiving passages of the die, means for returning the carrier to bring the heel-holder into attaching position, and means for temporarily retaining the carrier against the force of the returning means.

28. In a heel-attaching machine, a nailing die provided with nail-receiving passages, a carrier having a heel-holder and a top-lift-holder mounted to move above the die, a transferring member movable to deliver nails to the die-passages and acting upon the carrier to remove both the heel- and top-lift-holders from above the nail-receiving passages of the die, means for returning the carrier to bring the heel-holder into attaching position, and means set in the movement of the carrier for temporarily retaining the carrier against the force of the returning means.

29. In a heel-attaching machine, a nailing die provided with nail-receiving passages, a carrier having a heel-holder and a top-lift-holder mounted to move above the die, a transferring member movable to deliver nails to the die-passages and acting upon the carrier to remove both the heel- and top-lift-holders from above the nail-receiving passages of the die, means for returning the carrier to bring the heel-holder into attaching position, means for temporarily retaining the carrier against the force of the returning means, and means for releasing the retaining means to allow the returning means to bring the top-lift-holder into attaching position.

30. In a heel-attaching machine, a nailing die provided with nail-receiving passages, means for pressing the work against said die, a carrier having a heel-holder and a top-lift-holder mounted to move above the die, a transferring member movable to deliver nails to the die-passages and acting upon the carrier to remove both the heel- and top-lift-holders from above the nail-receiving passages of the die, means for returning the carrier to bring the heel-holder into attaching position, means for temporarily retaining the carrier against the force of the returning means, and means movable under the influence of the pressure means for releasing the retaining means to allow the returning means to bring the top-lift-holder into attaching position.

31. In a heel-attaching machine, a nailing die provided with nail-receiving passages, a transferring member movable at one side of the die to deliver nails thereto, and a carrier movable above the die by the transferring member and having a heel-holder and a top-lift-holder, said heel-holder being at the side of the carrier toward the transferring member.

32. In a heel-attaching machine, a nailing die provided with nail-receiving passages, a transferring member movable at one side of the die to deliver nails thereto, a carrier movable above the die by the transferring member and having a heel-holder and a top-lift-holder, said heel-holder being at the side of the carrier toward the transferring member, and means acting upon reverse movement of the transferring member to present successively the heel- and top-lift-holders above the die.

33. In a heel-attaching machine, a nailing die provided with nail-receiving passages, a swing-plate pivoted to move above the die and having a heel-holder and a top-lift-holder, and an oscillatory loader-arm for delivering nails to the die and movable into engagement with the swing-plate at the side toward the heel-holder to remove the holders from above the die.

34. In a heel-attaching machine, a nailing die provided with nail-receiving passages, a swing-plate pivoted to move above the die and having a heel-holder and a top-lift-holder, an oscillatory loader-arm for delivering nails to the die and movable into engagement with the swing-plate at the side toward the heel-holder to remove the holders from above the die, and a spring associated with the pivot of the swing-plate to return the holders above the die.

35. In a heel-attaching machine, a reciprocatory cross-head, a die mounted upon the crosshead and provided with nail-receiving passages, a swing-plate pivoted upon the crosshead to move above the die and having a heel-holder and top-lift-holder, an oscillatory loader-arm for delivering nails to the die and movable into engagement with the swing-plate to remove both holders from above the die, and a spring acting to return the holders to their heel- and top-lift-presenting positions.

36. In a heel-attaching machine, a reciprocatory crosshead, a die mounted upon the crosshead and provided with nail-receiving passages, a swing-plate pivoted upon the cross-head to move above the die and having a heel-holder and top-lift-holder, an oscillatory loader-arm for delivering nails to the die and movable into engagement with the swing-plate to remove the holders from above the die, a spring acting to return the holders to their heel- and top-lift-presenting positions, and a latch movable upon the crosshead to retain the swing-plate against the force of the spring.

37. In a heel-attaching machine, a reciprocatory crosshead, a die mounted upon the crosshead and provided with nail-receiving passages, a swing-plate pivoted upon the cross-head to move above the die and having a heel-holder and top-lift-holder, an oscillatory loader-arm for delivering nails to the die and movable into engagement with the swing-plate to remove the holders from above the die, a spring acting to return the holders to their heel- and top-lift-presenting positions, a latch movable upon the crosshead to retain the swing-plate against the force of the spring, and a second latch connected to the swing-plate-latch and acting to temporarily retain it for the heel-presenting position of the swing-plate.

38. In a heel-attaching machine, a reciprocatory crosshead, a die mounted upon the crosshead and provided with nail-receiving passages, a back-rod through which the work is pressed against the die, a swing-plate pivoted upon the cross-head to move above the die and having a heel-holder and top-lift-holder, an oscillatory loader-arm for delivering nails to the die and movable into engagement with the swing-plate to remove the holders from above the die, a spring acting to return the holders to their heel- and top-lift-presenting positions, a latch movable upon the crosshead to retain the swing-plate against the force of the spring with the heel-holder in presenting position, a second latch connected to the swing-plate and acting to temporarily retain the first latch for the heel-presenting position of the swing-plate, and means movable by the back-rod for releasing the second latch.

39. In a heel-attaching machine, a nailing die provided with nail-receiving passages, a carrier for heel-portions mounted to move above the die, a lever fulcrumed upon a member fixed relatively to the die and arranged for engagement by the carrier in its movement, and a cushioning device connected to the lever and to the fixed member.

40. In a heel-attaching machine, a nailing die provided with nail-receiving passages, a carrier for heel-portions mounted to move above the die, a lever fulcrumed upon a member fixed relatively to the die and arranged for engagement by the carrier during its movement in opposite directions, and a cushioning device connected to the lever and to the fixed member.

41. In a heel-attaching machine, a nailing die provided with nail-receiving passages, a carrier for heel-portions mounted to move above the die, a lever fulcrumed upon a member fixed relatively to the die and having an arm arranged for engagement by the carrier in its movement, and a cushioning device connected to another arm of the lever and to the fixed member, the ratio of lengths of the lever-arms being such as to increase the resistance to movement of the carrier by the cushioning device.

42. In a heel-attaching machine, a nailing die provided with nail-receiving passages, a carrier having a heel-holder and a top-lift-holder mounted to move above the die, a lever fulcrumed upon a member fixed relatively to the die and arranged for engagement by the carrier in its movement, and a dash-pot having a cylinder and a piston, one of which elements is joined to the lever and the other to the fixed member.

43. In a heel-attaching machine, a reciprocatory crosshead, a die mounted upon the crosshead and provided with nail-receiving passages, a swing-plate pivoted upon the crosshead to move above the die and having a heel-holder and top-lift-holder, an oscillatory loader-arm for delivering nails to the die and movable into engagement with the swing-plate to remove the holders from above the die, a spring acting to return the holders to their heel- and top-lift-presenting positions, a cylinder carried by the crosshead, a lever fulcrumed upon the crosshead and arranged for engagement by the swing-plate during its movement by the spring, and a piston operating in the cylinder and connected to the lever.

CHARLES A. ROBINSON.

CERTIFICATE OF CORRECTION.

Patent No. 2,261,288.  November 4, 1941.

CHARLES A. ROBINSON.

It is hereby certified that error appears in the printed specification of the above numbered patent requiring correction as follows: Page 8, second column, line 19, claim 38, for "swing-plate" read --swing-plate-latch--; and that the said Letters Patent should be read with this correction therein that the same may conform to the record of the case in the Patent Office.

Signed and sealed this 13th day of January, A. D. 1942.

(Seal)

Henry Van Arsdale,
Acting Commissioner of Patents.